US008655624B2

(12) United States Patent
Delajoud et al.

(10) Patent No.: US 8,655,624 B2
(45) Date of Patent: Feb. 18, 2014

(54) SYSTEM AND METHOD FOR OBJECTIVE SELF-DIAGNOSIS OF MEASUREMENT DEVICE CALIBRATION CONDITION

(75) Inventors: Pierre Delajoud, Neuilly sur Seine (FR); Martin Girard, Paradise Valley, AZ (US)

(73) Assignee: Fluke Corporation, Everett, WA (US)

( * ) Notice: Subject to any disclaimer, the term of this patent is extended or adjusted under 35 U.S.C. 154(b) by 827 days.

(21) Appl. No.: 12/137,290

(22) Filed: Jun. 11, 2008

(65) Prior Publication Data

US 2009/0312984 A1    Dec. 17, 2009

(51) Int. Cl.
*G06F 11/30* (2006.01)
*G21C 17/00* (2006.01)
*H03F 1/26* (2006.01)
*H04B 15/00* (2006.01)

(52) U.S. Cl.
USPC .......................................... 702/183; 702/199

(58) Field of Classification Search
USPC ................................................. 702/183, 199
See application file for complete search history.

(56) References Cited

U.S. PATENT DOCUMENTS

| 6,868,358 | B2 * | 3/2005 | Brown, Jr. ..................... 702/138 |
| 2003/0176959 | A1 * | 9/2003 | Breed ............................. 701/36 |
| 2006/0279722 | A1 * | 12/2006 | De Mol .......................... 355/77 |
| 2006/0287806 | A1 * | 12/2006 | Hori ............................... 701/114 |
| 2010/0243791 | A1 * | 9/2010 | Zubkow et al. ............... 244/3.15 |

FOREIGN PATENT DOCUMENTS

WO    WO 2008036088 A1 *    3/2008

OTHER PUBLICATIONS

"Non-Final Office Action dated Dec. 9, 2010 from corresponding Chinese Application No. 200910140636.5".

* cited by examiner

*Primary Examiner* — Alexander H Taningco
*Assistant Examiner* — Manuel Rivera Vargas
(74) *Attorney, Agent, or Firm* — Christensen O'Connor Johnson Kindness PLLC

(57) ABSTRACT

A measurement system uses a plurality of transducers that may differ from each other in at least one respect, such as having different operating principles or being made by different manufacturers. Respective measurement values obtained from the transducers are applied to a processor which provides a measured value based on the measurement values from a plurality of the transducers. The processor also provides information about the calibration drift of each of the transducers based upon a comparison between the measurement value obtained from the transducer to a value obtained from a combination of respective measurement values obtained from a plurality of the transducers. The calibration drift information provides an objective evaluation about the calibration condition of each of the transducers. When a transducer is determined to be outside of its calibration tolerance, a calibration needed alert occurs.

10 Claims, 3 Drawing Sheets

SYSTEM AND METHOD FOR OBJECTIVE SELF-DIAGNOSIS OF MEASUREMENT DEVICE CALIBRATION CONDITION

TECHNICAL FIELD

This application relates to measurement systems and methods, and, more particularly, to a measurement system and method that allows calibration periods to be extended with very low risk of overextending without impairing measurement accuracy.

BACKGROUND OF THE INVENTION

Every measurement device drifts or changes with time. As a result of this drift, every measurement device must be recalibrated regularly to assure that measurements made by the device remain within a tolerance that is normally defined by specifications of the measurement device. Failure to calibrate the measurement device before it is out of tolerance may have negative consequences, including recalling or questioning all measurements made by the device since the last calibration. A failure to calibrate can also result in erroneous measurements in the field, which can be disastrous in terms of quality, cost, safety, etc. It is therefore highly desirable to calibrate at sufficiently short recalibration intervals.

Although a short recalibration interval is desirable to ensure accurate measurements, a recalibration interval that is shorter than necessary increases calibration frequency thus increasing direct and indirect calibration costs, such as instrument downtime, shipping and associated risks. Currently, the recalibration interval is usually based on past experience with similar devices, and it is selected based on the largest anticipated calibration drift of the measurement device.

The difficulty in selecting an adequately short recalibration interval is exacerbated by the fact that calibration drift occurs in different measurement devices at different rates. Therefore, the recalibration interval of a measurement device is usually statistically determined on the basis of the calibration drift history of a population of similar devices. An interval is then chosen that provides an acceptable likelihood of in-tolerance conditions at calibration. Given the very high cost of out of tolerance conditions at recalibration, the interval must be conservative, and it therefore causes a majority of measurement devices to be calibrated earlier than necessary thereby unnecessarily increasing costs. In addition, the predictive statistical method has no chance of identifying outliers whose behavior deviates significantly from predicted behavior.

There is therefore a need for a system and method that provides an alternative to predictive recalibration interval selection so that a longer recalibration interval can be used without risking out of tolerance conditions at recalibration.

SUMMARY

A measurement system and method makes a plurality of measurements at least some of which are measured independently of the other measurements. The system then derives a measured value from a combination of values obtained from at least some of the plurality of respective measurements. The plurality of measurements obtained by the system and method are also used to provide information about calibration drift of measurement devices used to make the measurements, such as an indication of whether the accuracy of at least some of the plurality of measurements is less than a predetermined accuracy.

DETAILED DESCRIPTION

Figure 1:
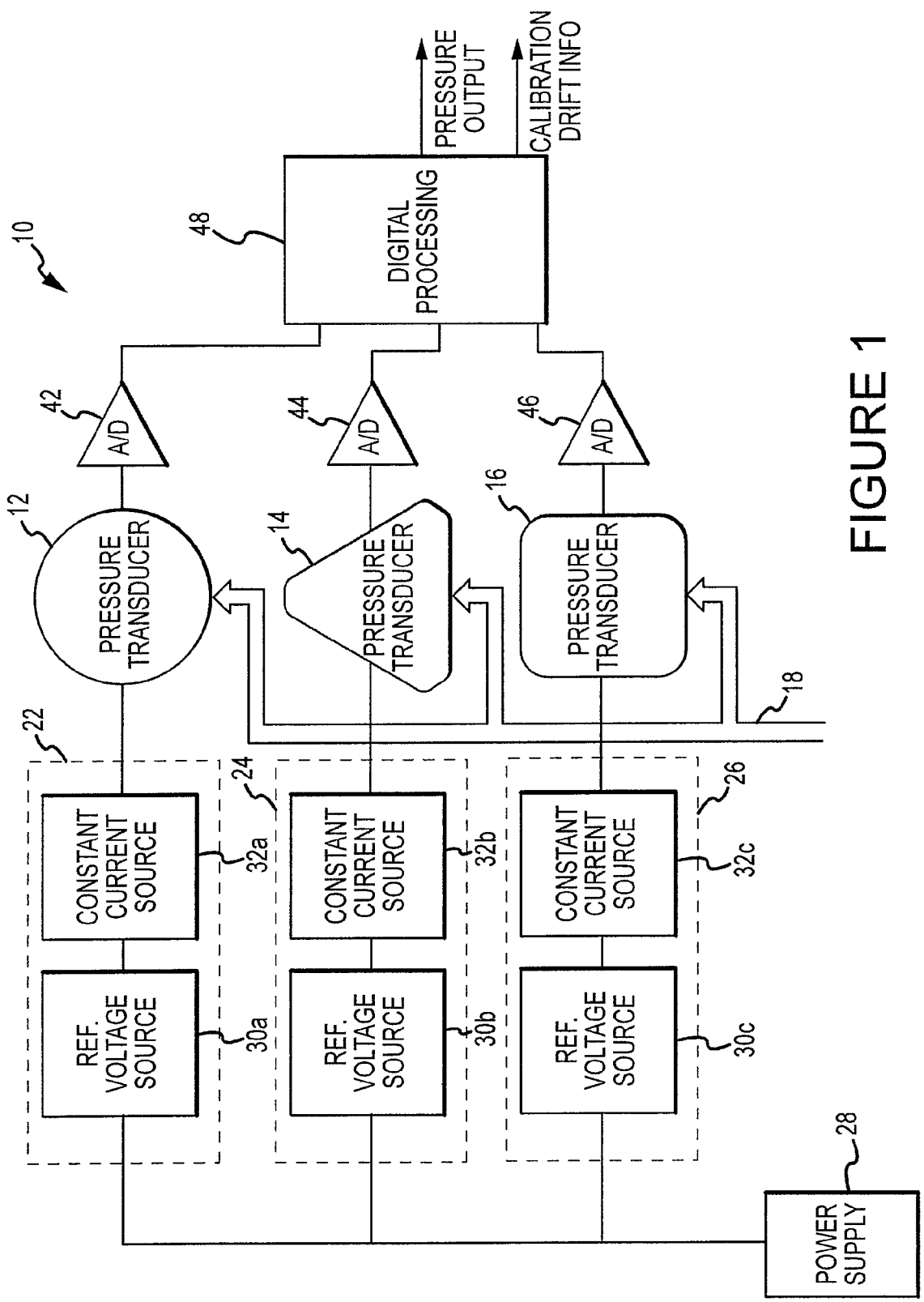
FIG. 1 is a block diagram of a pressure measurement system according to one embodiment of the invention.

A measurement system 10 according to one embodiment of the invention is shown in FIG. 1. The system 10 is used for measuring pressure, but the principle of operation could be used for a system measuring any other kind of physical variable, such as temperature, or a characteristic of an electrical signal, such a voltage or frequency. The system 10 includes three pressure transducers 12, 14, 16 having respective inlet ports that are connected to a common pressure conduit 18. The pressure transducers 12, 14, 16 are powered by respective current sources 22, 24, 26 that are powered by a common power supply 28. Each of the current sources 22, 24, 26 includes a reference voltage source 30a,b,c that provides a regulated voltage, and a constant current source 32a,b,c that converts a reference voltage from the voltage source 30a,b,c to a corresponding current. However, different types of power supplies may be used depending upon the nature of measurement devices used in a system. Also, although the system 10 uses three pressure transducers 12, 14, 16 and associated components, only two pressure transducers or more than three pressure transducers could be used. However, three pressure transducers 12, 14, 16 is the minimum number of transducers that make it possible to identify a pressure transducer providing measurements that differ markedly from the others.

Each of the pressure transducers 12, 14, 16 provides an analog output voltage that corresponds to the pressure in the conduit 18 measured by the transducers 12, 14, 16. The output voltages are applied to respective analog-to-digital ("A/D") converters 42, 44, 46, which output respective digital output signals indicative of the pressures measured by the transducers 12, 14, 16, respectively. The digital output signals from the A/D converters 42, 44, 46 are applied to a digital processor 48, which may be, for example, a computer system running an application program performing a suitable analysis algorithm, as discussed in greater detail below. The digital processor 48 determines and provides an indication of not only a measured pressure, but also information relating to the calibration drifts of the pressure transducers 12, 14, 16.

A variety of algorithms can be used to determine the measured pressure and the calibration drift. A value for the measured pressure can be obtained, for example, from an average or a weighted average of the pressure measurements obtained from each of the pressure transducers 12, 14, 16. In some embodiments, a measured pressure value is obtained from the measurements of only two of the pressure transducers 12, 14, 16, and the value measured by one of the transducers 12, 14, 16 is ignored because, for example, the pressure value differs excessively from the pressure measured by the other two pressure transducers 12, 14, 16. The calibration drift can be obtained by a variety of means. For example, the value of the pressure measured by each of the pressure transducers 12, 14, 16 can be compared to the average or a weighted average of the measured pressure values. If the value of the pressure measured by any of the transducers 12, 14, 16 differs from the average by more than a specific value, a calibration alert indicating that the transducers 12, 14, 16 need to be calibrated can be provided. Other means of detecting that calibration drift has reached a specific value will be apparent to one skilled in the art.

The transducers 12, 14, 16 may be identical to each other, or two or more may be different from each other in a variety of respects. For example the pressure transducers 12, 14, 16 may have different principles of operation, such as the transducer 12 having a diaphragm instrumented with resistance strain gauges, the transducer 14 having a diaphragm instrumented with resonant beam force sensor, and the transducer 16 having a spring compressed or tensioned responsive to pressure changes and instrumented with a position sensor that senses the position of a movable end of the spring. As another example, the pressure transducers 12, 14, 16 may all use a common principle of operation, but they may be made by different manufacturers. Alternatively, they may all use a common principle of operation and be made by the same manufacturer, but be from different manufacturing lots. Other variations between the pressure transducers 12, 14, 16 are also possible. Using pressure transducers 12, 14, 16 that differ from each other in some respects tends to lessen the probability that their calibration drifts will match each other.

Figure 2:
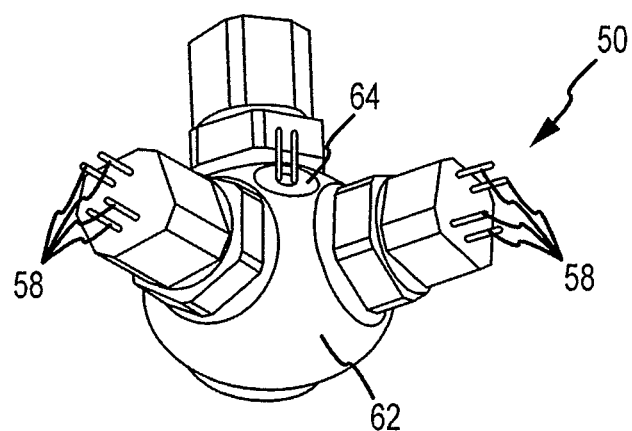
FIG. 2 is a side isometric view of a pressure measurement device according to one embodiment of the invention.
Figure 3:
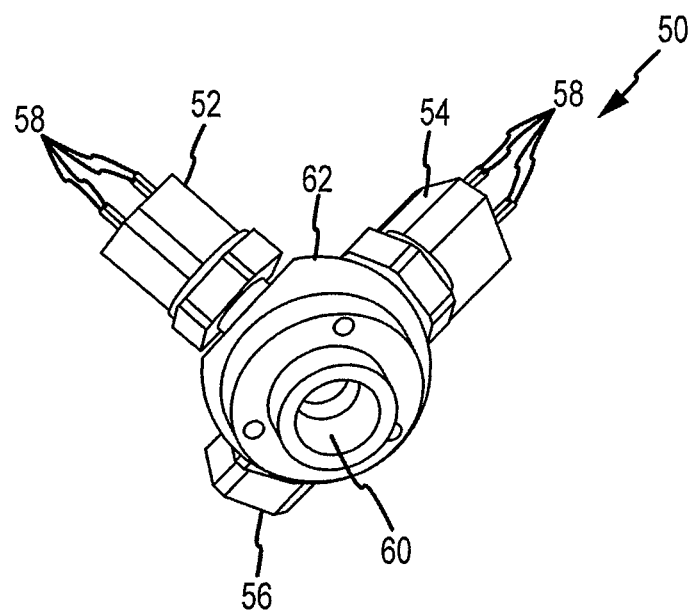
FIG. 3 is a bottom isometric view of the pressure measurement device of FIG. 2.

An embodiment of a pressure sensor 50 is shown in FIGS. 2 and 3. The pressure sensor 50 includes three pressure transducers 52, 54, 56 that may be identical to each other or they may be different, as explained above. Each of the transducers 52, 54, 56 includes electrical terminals 58 through which the transducer 52, 54, 56 is powered and from which a signal indicative of the measured pressure can be obtained. The transducers may be symmetrically positioned in three 90 degree axes about a pressure port 60 (FIG. 3) that extends from a spherical housing 62. Also, a temperature probe 64 (FIG. 2) may be positioned equidistant from all of the transducers 52, 54, 56. Symmetrically positioning the transducers 52, 54, 56 on a sphere equidistant from the test pressure port ensures that they are all exposed to the pressure in the same manner even if the pressure changes so that valid comparisons can be made between the pressures measured by the transducers. Orienting the transducers in three 90 degree axes provides independence of the overall sensor from orientation and gravity effects. In use, the pressure port 60 may face in any direction.

Figure 4:
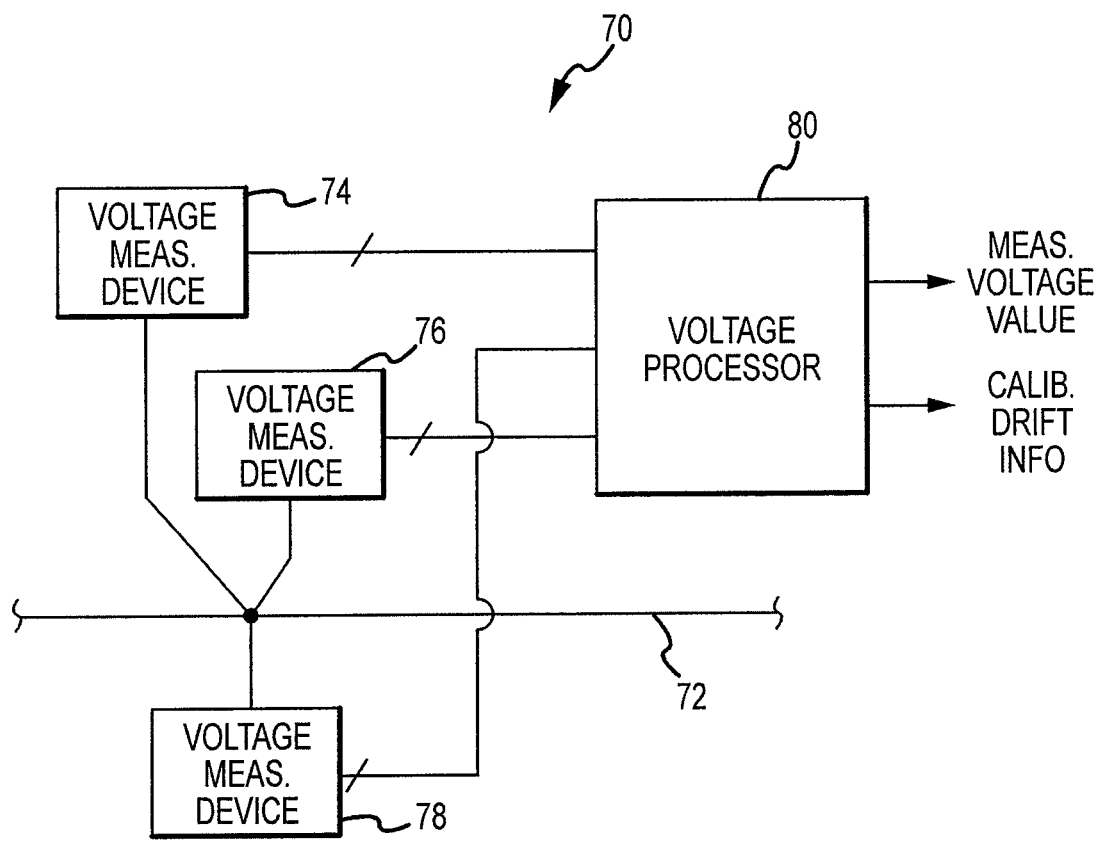
FIG. 4 is a block diagram of an electrical measurement system according to one embodiment of the invention.

A measurement system 70 according to another embodiment of the invention is shown in FIG. 4. The system 70 measures the voltage on a wire 72 using three separate voltage measuring devices 74, 76, 78. Each of the voltage measuring devices 74, 76, 78 provides a respective digital output to a voltage processor 80, which uses a suitable algorithm as explained above to provide a measured voltage value and information relating to calibration drift, such as a calibration needed alarm. Again, the voltage measuring devices 74, 76, 78 may be identical to each other, or they may differ from each other in a variety of respects as previously explained. The voltage measuring devices 74, 76, 78 may be connected to the wire 72 at the same location so that they are exposed to the same measurement environment. For example, if the voltage measuring devices 74, 76, 78 were connected to the wire 72 at different locations, a voltage drop might exist along the length of the wire, or a voltage could be capacitively coupled to one location on the wire 72 to a greater or less extend than to another location.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A pressure sensor system comprising:
   a pressure sensor comprising:
     a housing;
     a pressure port that extends from the housing; and
     at least three pressure transducers, wherein the pressure transducers are symmetrically positioned in three 90 degree axes about the pressure port; and
   one or more digital processors, the pressure sensor system having stored therein program instructions configured to cause the one or more digital processors to:
     receive at least three pressure measurement values obtained by the pressure transducers;
     determine an average value of the pressure measurement values; and
     for each of the pressure measurement values:
       calculate a difference between the respective pressure measurement value and the average value;
       compare the calculated difference with a calibration drift value; and
       based on the comparison, determine whether to output a calibration alert to indicate that one or more of the respective pressure transducers are out of tolerance.

2. The pressure sensor system of claim 1, wherein the pressure sensor further comprises a temperature probe.

3. The pressure sensor system of claim 2 wherein the temperature probe is positioned equidistant from the pressure transducers.

4. The pressure sensor system of claim 1, wherein at least two of the pressure transducers have different principles of operation.

5. The pressure sensor system of claim 1, wherein the average value comprises a weighted average value.

6. The pressure sensor system of claim 1, wherein the housing is spherical.

7. In a digital processing system comprising one or more digital processors, a method comprising, by the one or more digital processors: receiving at least three measured pressure values obtained by a pressure sensor comprising a spherical housing, a pressure port that extends from the spherical housing, and at least three pressure transducers symmetrically positioned in three 90 degree axes about the pressure port; performing a calculation of an average value of less than all of the at least three measured pressure values, wherein at least one of the at least three measured pressure values is omitted from the calculation; and for each of the at least three measured pressure values: calculating a difference between the respective measured pressure value and the average value of less than all of the at least three measured pressure values; comparing the calculated difference with a calibration drift value; and based on the comparing, determining whether to output a calibration alert to indicate that a respective pressure transducer is out of tolerance.

8. The method of claim 7 wherein at least two of the at least three pressure transducers have different principles of operation, and wherein the at least three pressure transducers are selected from the group consisting of: transducer having a diaphragm instrumented with resistance strain gauges, transducer having a diaphragm instrumented with a resonant beam force sensor, and transducer having a spring instrumented with a position sensor configured to sense the position of a movable end of the spring.

9. The method of claim 7 wherein the at least one measured pressure value is omitted based on a determination that the omitted pressure value differs excessively from the other measured pressure values.

10. In a digital processing system comprising one or more digital processors, a method comprising, by the one or more digital processors:

receiving at least three pressure measurement values obtained by a pressure sensor comprising a spherical housing, a pressure port that extends from the spherical housing, and at least three pressure transducers symmetrically positioned in three 90 degree axes about the pressure port; determining an average value of the pressure measurement values; and for each of the pressure measurement values: calculating a difference between the respective pressure measurement value and the average value; comparing the calculated difference with a calibration drift value; and based on the comparing, determining whether to output a calibration alert to indicate that one or more of the respective pressure transducers are out of tolerance.

\* \* \* \* \*

UNITED STATES PATENT AND TRADEMARK OFFICE
CERTIFICATE OF CORRECTION

PATENT NO. : 8,655,624 B2  
APPLICATION NO. : 12/137290  
DATED : February 18, 2014  
INVENTOR(S) : Delajoud et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this
Eleventh Day of August, 2015

Michelle K. Lee
*Director of the United States Patent and Trademark Office*